United States Patent [19]

Temple et al.

[11] Patent Number: 4,590,749
[45] Date of Patent: May 27, 1986

[54] APPARATUS FOR AND METHOD OF SHIRRING A TUBULAR CASING

[75] Inventors: Stephen Temple; Nigel J. Jones; Alan N. Syrop, all of Cambridge, England

[73] Assignee: Devro, Inc., Somerville, N.J.

[21] Appl. No.: 714,670

[22] Filed: Mar. 22, 1985

[30] Foreign Application Priority Data

Mar. 30, 1984 [GB] United Kingdom ............... 8408330

[51] Int. Cl.⁴ ............................................. A22C 13/02
[52] U.S. Cl. .................................. 53/576; 17/1 R; 17/41; 53/581
[58] Field of Search ............... 17/1 R, 41, 42, 49; 53/576, 581, 397; 493/302, 407, 463, 940

[56] References Cited

U.S. PATENT DOCUMENTS

| | | | |
|---|---|---|---|
| 2,983,949 | 5/1961 | Matecki | 53/581 |
| 3,209,398 | 10/1965 | Ziolko | 17/42 |
| 3,688,343 | 9/1972 | Ziolko | 17/42 |
| 4,210,981 | 7/1980 | Story | 17/41 |

FOREIGN PATENT DOCUMENTS 2912474 10/1980 Fed. Rep. of Germany ......... 17/41

*Primary Examiner*—John Sipos
*Assistant Examiner*—Donald R. Studebaker

[57] ABSTRACT

Apparatus for shirring a tubular casing includes a pair of shirring wheels with helical teeth.

The wheels 21,22 (FIG. 9) are moulded from flexible rubber or polyurethane. The leading edge 43 of a tooth of one wheel 22 is aligned (shown by a nominal straight line 48) with the leading edge 42 on the adjacent tooth on the other wheel 21.

The helical teeth are of controlled flexibility and the wheels may include circumferential walls joining the teeth.

Other features of the invention relate to the curvature of the crest or face surface of the teeth which are related to wheel diameter and to the desired diameter of the shirred stick or slug which is to be produced.

7 Claims, 11 Drawing Figures

APPARATUS FOR AND METHOD OF SHIRRING A TUBULAR CASING

This invention relates to an apparatus for and a method of shirring a tubular casing such as collagen or regenerated cellulosic casing of the kind employed in the manufacture of sausages.

It is known to pass a casing, inflated by air pressure, over a mandrel and between shirring belts or toothed wheels (also known as paddles) having teeth designed to produce a particular fold formation during shirring.

It has been proposed in the past that the teeth should be so designed as to produce a helical primary fold in the casing. It might be assumed that to do this the teeth of a pair of rolls or of three rolls used in conjunction should be so aligned as to form a helix when the teeth contacting the casing are diametrically opposite each other and adjacent to each, called for convenience the "bottom dead centre position". We have found that this assumption is incorrect.

An object of the invention is to provide a configuration of shirring wheels and a method of operating those wheels which will enable a shirred stick to be produced substantially without discontinuities in the primary fold which occur in use of prior art machines.

In accordance with the present invention the teeth on at least a pair of shirring wheels are so designed that at the point of contact of the leading edge of a tooth of a shirring wheel with the maximum diameter of the casing i.e. at the point where the casing has already been pushed into a fold and the fold is about to be ironed, the leading edges of teeth on adjacent wheels are in substantially helical alignment. The helical alignment should be precise, but if three wheels are used it may be sufficient that the tooth form is a straight line.

This point will occur when the leading edges of the adjacent teeth of the paddles or wheels are at an angle of a few degrees past the bottom dead centre position. The precise angle "A" depends upon the required radius of the external surface of the shirred slug and on the minimum radius of the shirring wheel teeth and is determined by the formula:

$$A = \cos^{-1}(R-r)/R;$$

where

A is the angle in degrees of the leading edges of the adjacent teeth past the bottom dead centre position;

R is the minimum radius of the tooth from the shirring wheel axis; and r is the expected or predetermined slug radius.

Each tooth is preferably formed with a groove of substantially semi-circular section, in a radial plane, in its outer face and "R" is then the radius through the shirring wheel axis of the base of the groove in the tooth.

The form of the teeth is a very important aspect of the present invention, the teeth are spaced round the wheel at a circumferential distance apart so that the mark/space ratio lies in the range 3:4 to 4:3. The preferred mark/space ratio is 1:1.

The mark/space ratio is defined as the nominal ratio between the tooth thickness and the gap between teeth measured in the same direction, i.e. a mark/space ratio of 1:1 means that half the circumference of the paddle roll is tooth and half the gap between the teeth. The features which dictate the selection of the mark/space ratio are that a bubble must be allowed to form in the space, which leads to shirr formation, and so there must be sufficient space between the leading edge of one tooth and the trailing edge of the next one to allow a buckle or bubble to form. On the other hand if a very thin tooth is adopted it becomes more difficult to prevent the casing from re-inflating.

The active part of the tooth, that is the surface of the tooth which comes into contact with the casing or shirred material, is enclosed by concavo-convex surfaces, called for convenience the face of the tooth, and the flanks of the tooth. The intersections of the face, or crest, of the tooth and the flanks are termed, for convenience the edges. For a given direction of rotation one edge will lead the other and for convenience they are differentiated as the leading and trailing edges.

In accordance with the invention the curvatures of the crest or face surface are derived from the diameter of the paddle and the desired slug diameter as follows:

The crest surface is part of a groove of substantially semi-circular cross section in a radial plane and is uniform at all points around the shirring wheel. The radius of the radical cross section of the groove is that of the desired finished slug outside diameter less a factor which takes account of the flexing of the teeth during shirring.

This factor will depend upon the stiffness of the paddle material and the thickness of the tooth forms employed but will result in a radius noticably smaller than the casing. The amount by which the radius of the cross section of the tooth is reduced may be between 15 and 30% and in a typical case would be between 20 and 30%.

The leading edge of each tooth is defined by a series of points on the groove which cross the outside diameter of the slug coincidentally with the desired fold line on the casing, normally a helical fold.

The trailing edge of each tooth is defined by a series of points approximately parallel to the leading edge such that on any circular section perpendicular to the axis of the ratio of the circumferential length between successive points where the leading and trailing edges cut that section and the circumferential length between either point and the next such point is constant.

Each flank surface of each tooth is formed so that it meets the crest or face of the tooth at a nominally constant angle, called for convenience the rake angle. Thus a flank surface at a nominally constant angle is presented to the casing at all points around its periphery.

The shirring wheels or paddles perform three different functions. Firstly they move the casing along towards the shirring area and this is known as driving the casing. Secondly they displace the casing to initiate a fold in the casing which is known as layering. Thirdly they press down the initially formed fold into its final shape forming the sharply defined crease or fold line which is known as the primary fold. This process is known as ironing.

Driving the casing is difficult particularly when only two wheels or paddles are used. In order to improve the drive it is preferable, in accordance with the invention, to introduce a controlled degree of flexibility in the wheels or paddles in the cylindrical direction of the paddle wheel whilst retaining the torsional stiffness of the wheel.

Thus, in accordance with another aspect of the invention the wheels or paddles are provided with flexible teeth. Preferably this flexibility is brought about by means of a series of selected cut-outs in the outer walls of the wheel and by selection of a suitable rubber or rubber like material for the wheel. The cut-outs in the wheel are designed to produce uniform flexibility throughout the circumference of the wheel. The flexibility is preferably related to the flexibility of the material of the casing so as to produce sufficient interference between the wheel and the casing to drive a casing.

Having achieved the necessary drive we found that the interference between the wheel and casing is far too great during the formation of each primary shirr fold. By making the wheel flexible we overcome this problem in that sufficient interference is provided for drive without an excess of interference during the formation of the primary folds.

Although the clearance between wheels particularly with two wheels in accordance with the preferred embodiment of this invention, is preferably nominal, i.e. the wheels are almost touching, it is also possible and a feature of this invention that the wheel might be locked in phase by inter-engaging teeth on the two wheels.

In prior art constructions the teeth are in the form discrete teeth attached to the wheel or formed on the wheel without connecting circumferential walls.

To control the strength and flexibility of the wheel we have found it desirable to join the helical teeth by circumferential walls so that in effect the teeth are cut out from a solid wall. Formation of these walls also helps to control the flexibility.

When a casing is shirred the resultant compact shirred casing, known as a stick, may contain a considerable length e.g. 24 meters of casing in a relatively short length of "stick", e.g. 23 cms. The ratio between the original length of the casing and the length of the shirred stick is defined as the compression ratio, the length of the shirred stick being measured between the peaks on the first and last of the primary folds.

A more accurate way of indicating the amount of casing which is included in a given shirred stick, taking account of the thickness of the material of which the casing is made, is to define in terms of "packing efficiency". The packing efficiency is the ratio of the volume of a casing when laid flat (before shirring) divided by the effective volume of the annular slug or stick, expressed as a percentage. It is calculated by the following formula:

$$\frac{\text{Length of unshirred casing} \times 2 \times \text{wall thickness} \times \text{width of laid flat casing} \times 100}{\text{Stick or slug length} \times \frac{PI}{4} \times (\text{outside diameter of stick}^2 - \text{bore of stick}^2)}$$

(Width of laid flat casing is known as "lay-flat").

This thickness of the material is preferably measured by use of an Elcometer thickness monitor.

By use of the present invention it is possible to produce sticks having increased compression ratios compared with those produced by other machines. In accordance with the present invention a shirred stick has a compression ratio in the range 95 to 140. This is achieved without reduction of the bore or detriment to the run-out properties of the shirred stick. Run-out is the de-shirring of the stick during filling in a sausage making process.

Also in accordance with the invention it is possible to produce a shirred stick having an increased packing efficiency, the packing efficiency being in the range 45 to 90%.

The advantage of the increase in compression ratio and packing efficiency is that more rigid shirred sticks, despite increased internal bore diameters, can be produced.

In the accompanying drawings:

FIG. 3 is an enlarged diagrammatic plan of a portion of the machine illustrating the tapered mandrel used in the present invention;

FIG. 4 is an enlarged portion of the tapered mandrel shown in FIG. 3;

FIG. 5 is a circumferential development of a portion of one of the shirring wheels shown in FIGS. 1 to 3;

Figure 1:
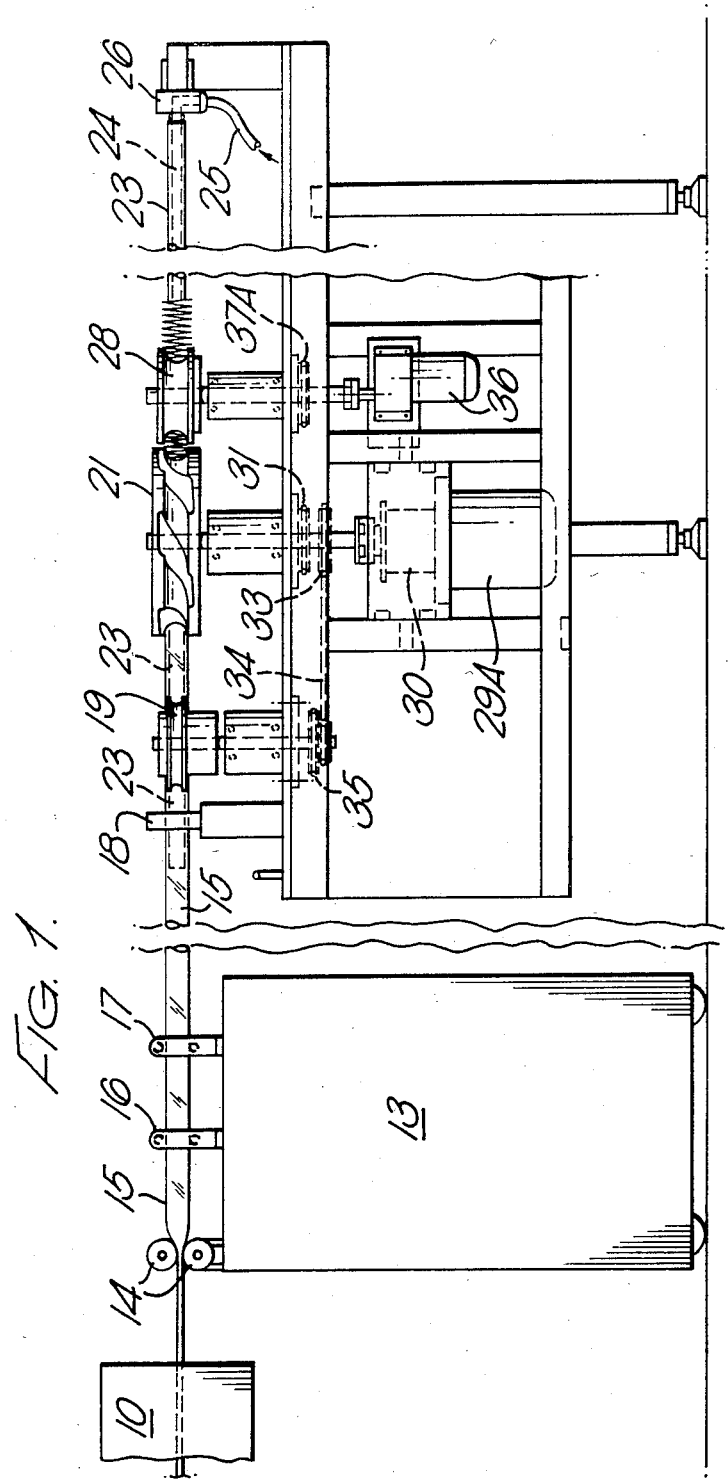
FIG. 1 is a side elevation showing portions of a shirring machine embodying the present invention.
Figure 2:
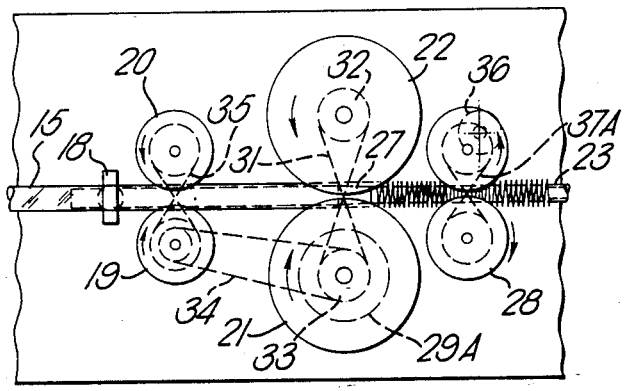
FIG. 2 is a plan of the central part only of the machine illustrated in FIG. 1.

The shirring machine shown in FIGS. 1 and 2 is diagrammatically represented and includes only those parts of the machine which are essential to an understanding of the invention.

As seen in FIG. 1, on the left of the machine is a drier 10 from which prepared collagen or cellulose casing is led through guide rollers 14, which grip the casing fairly tightly so that air which is put in the casing from the far end will not pass beyond rollers 14. The inflated casing is shown at 15 and is seen to pass through pairs of rolls 16 and 17 and through a guidance block 18 to a pair of drive rolls 19,20. The casing then enters the nip between the pair of shirring wheels 21,22. The casing as it passes through the drive rolls 19,20 and shirring wheels 21,22 passes over a mandrel 23. The mandrel has an internal passage 24 through which air is supplied under pressure from a source not shown via a pipe 25 and mandrel end fitting 26. The air flowing through pipe 25 and bore 24 enters the casing and keeps it expanded as shown in FIG. 1. The shirring wheels 21 and 22 shirr the casing and the shirring takes place along a tapered portion 27 of the mandrel 23, which will be described in more detail later. The shirred casing is compressed because the casing passes through compression rolls 28,29 which are rotated at about 100th of the speed of the drive rolls 19,20, and in the same direction of rotation as the drive rolls 19 and 20. The shirring rolls rotate in the same direction as the drive rolls but at about twice the speed of the drive rolls. The range of speeds within which they may rotate according to the physical characteristics of the casing is from about 1.5 to 2.5 times the speed of the drive rolls. It will be seen that the outside edges of the wheels are almost touching, the spacing between them being of the order of 1 to 2 mm.

The compression of the casing takes place entirely during the formation of the shirr and as the shirred stick or slug compresses between the shirring wheels and the compression rolls.

The shirred stick emerges from the compression rolls and when a suitable length has been formed can be cut off, slid along the mandrel 23 and off the end of the mandrel after removal of the end fitting 26, the air being cut-off temporarily while this occurs.

The shirring wheels 21,22 are driven by a shirring wheel motor 29A which, through a gear-box 30 drives shirring wheel 21. Shirring wheel 22 is driven at the same speed by means of a belt drive 31 and pulleys 32,33. The drive rolls 19 and 20 are also driven through a system of pulley wheels and belts 34,35. The compression rolls 28,29 are driven by a separate electric motor 36 via belts 37 and 37A.

Figure 7:
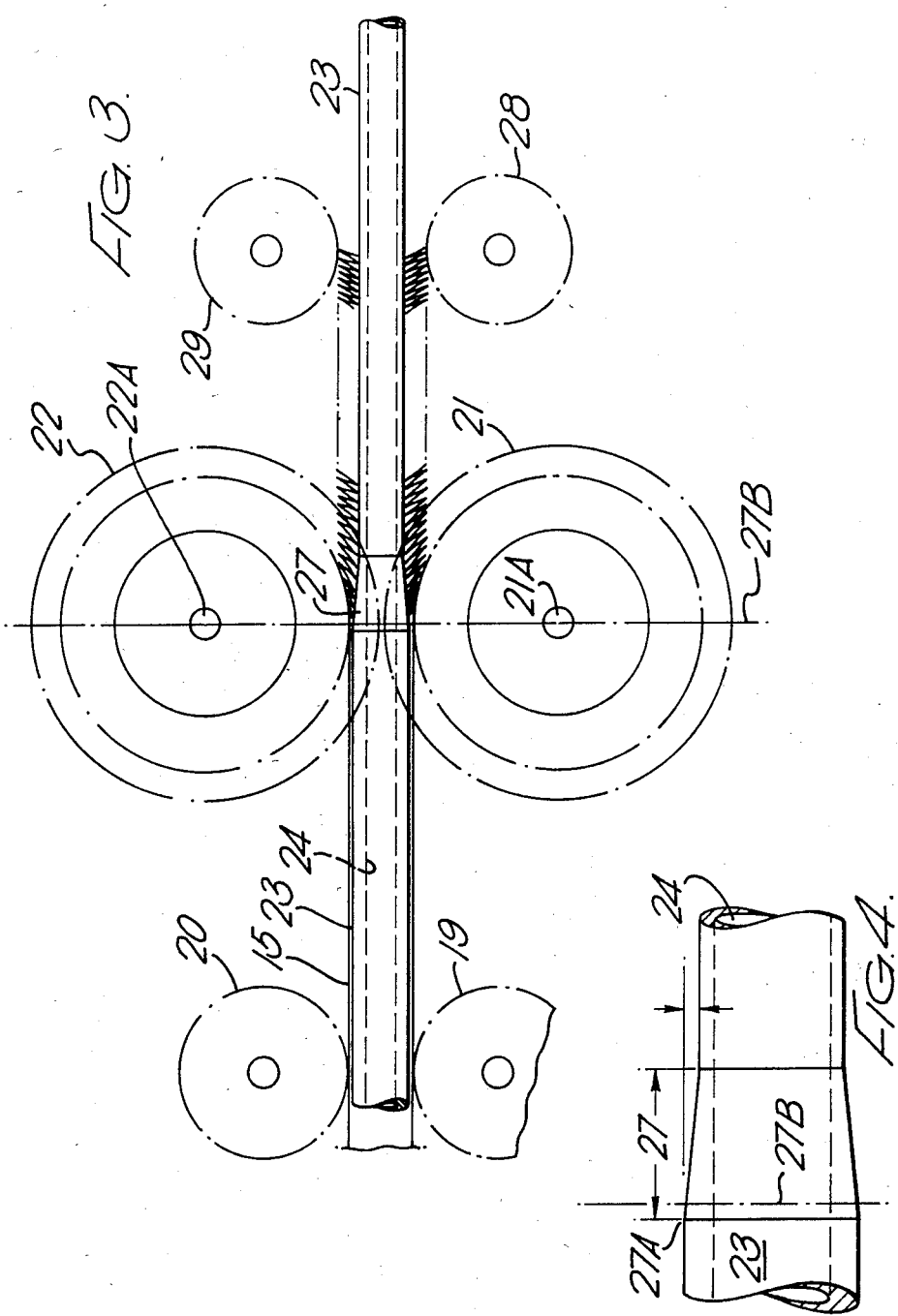
FIG. 7 is a part sectional plan on the line 7—7 shown in FIG. 6.
Figure 8:
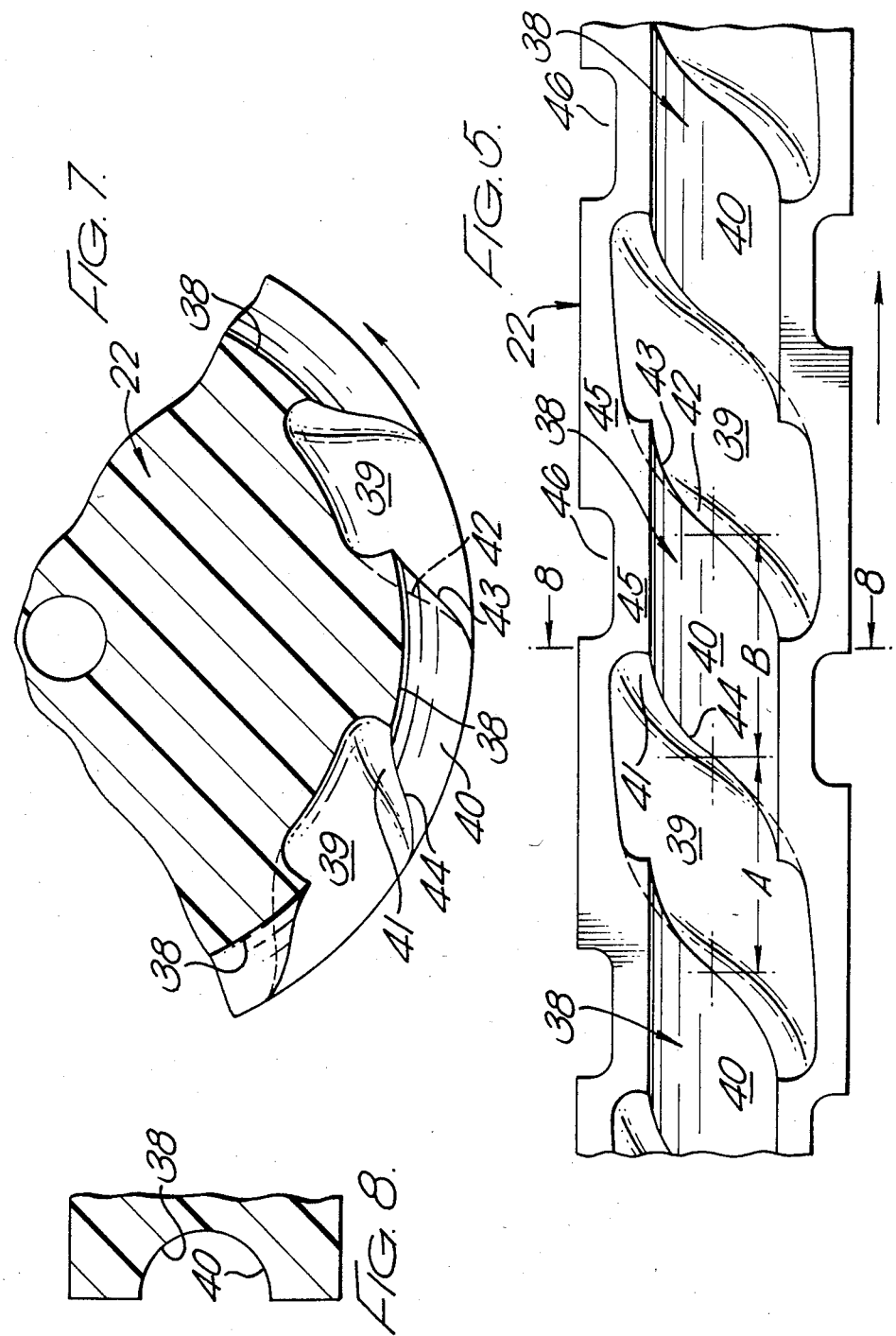
FIG. 8 is a section on the line 8—8 shown in FIG. 5.

The shirring wheels 21 and 22, which form an important aspect of this invention, are molded or otherwise formed from elastomer such as synthetic rubber or natural rubber, or polyurethane. The two wheels are identical and have at their outer periphery teeth 38 (see FIGS. 5 to 8) separated by spaces 39, the ratio of the tooth thickness (B in FIG. 5) to the space or gap between the teeth measured in the same direction (shown as A) is the mark/space ratio which as shown is about 1:1. Each tooth 38 has a face or crest surface 40. As seen in FIGS. 5 and 8 the face or crest of the tooth 39 has a semi-circular cross section in a radial plane and is uniform at all points around the shirring wheel. This point is seen clearly in FIG. 6 wherein the two outer teeth have the semi-circular cross section referred to above, and it is also seen in FIG. 8. Each tooth has two flank surfaces 41 and 42. Where the flank 42 joins the face or crest 40 is the leading edge 43 of the tooth 40, assuming rotation to be in the direction shown by the arrows in FIGS. 5, 6 and 7 of the drawings. Similarly where the flank 41 meets the crest 40 is the trailing edge 44.

Figure 6:
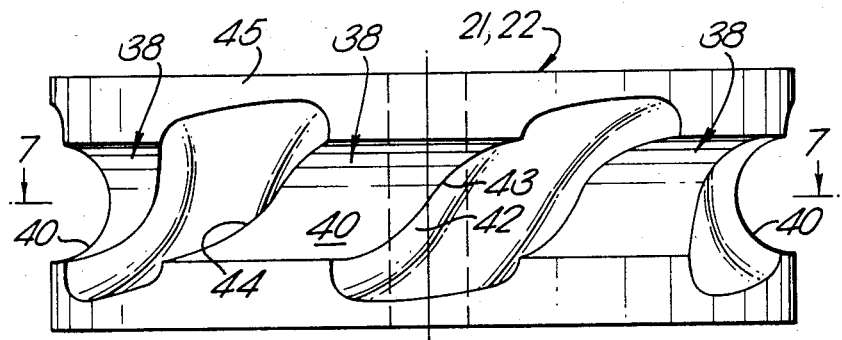
FIG. 6 is a side elevation of a portion of one of the shirring wheels.

The flank 41 meets the crest 40 at a nominally constant angle and similarly the flank 42 meets the crest 40 at a nominally constant angle. The edges 43 and 44 are of substantially helical formation as can be seen in FIGS. 5 and 6 the teeth 39 are joined by walls 45 portions of which are cut away at 46 to improve flexibility.

An important aspect of this invention is that the compression of the shirred stick takes place between the shirring wheels 21,22 and the compression rolls 28, 29, the compression, and the folding of the shirred stick, being controlled by the taper 27 on the mandrel 23 (see particularly FIGS. 3 and 4). The mandrel is tapered so that there is a 1 mm change in diameter for every 5 mm length of the mandrel. This tapered mandrel is described and illustrated in more detail in our copending U.S. patent application Ser. No. 714,772, filed Mar. 22, 1985.

Figure 9:
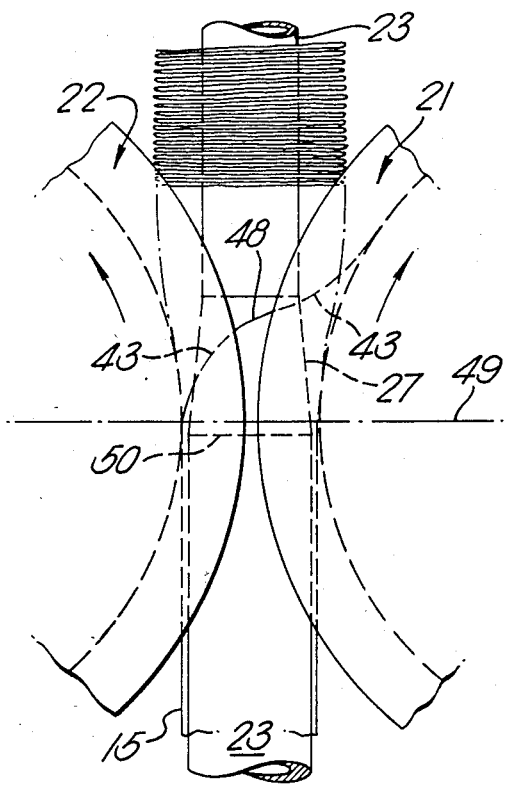
FIG. 9 is an enlarged diagrammatic illustration of the central portion of FIG. 3 showing the tapered mandrel and its relationship to the teeth of the shirring wheels.
Figure 10:
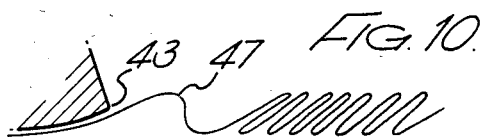
FIG. 10 shows diagrammatically the formation of a primary fold.
Figure 11:
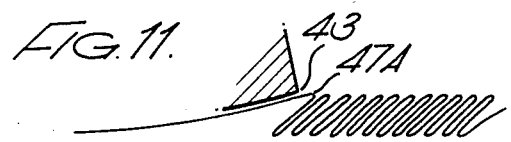
FIG. 11 is a further stage in the formation of the fold shown in FIG. 10.

The formation of a helical primary fold in the casing, which is part of the shirring process, is illustrated in FIGS. 10 and 11. The initial fold form is shown at 47 and this fold will be ironed or compressed into a helical primary fold by a subsequent tooth of the wheel. The leading edge of the tooth shown at 43 will create this ironing contact as shown in FIG. 11. We have found that it is most important that when this first ironing contact between the teeth of the wheels and the partially formed fold occurs the leading edges of the tooth should form a true helix and the leading edges of adjacent teeth should be aligned. This is illustrated in FIG. 9 where the leading edge 43 of a tooth of one of the shirring wheels 22 is aligned (shown as joined by a nominal straight line 48) with the leading edge 42 on the adjacent tooth on the other shirring wheel 21. It will be seen that this occurs not when the teeth are in the bottom dead centre position but at a point some degrees after the bottom dead centre, the line 49 indicating the bottom dead centre position. The amount by which the teeth have passed the bottom dead centre position is determined as previously described by the formula given.

FIG. 9 also illustrates the position of the taper 27 of the mandrel and it is seen that the taper 27 commences just before the bottom dead centre position at 50. A fairly typical case is when the point of alignment is 8° to 10° past bottom dead centre.

The improved shirred stick which results from use of the improved apparatus and method described above is characterised by a minimum of random folds and increased packing efficiency compared with prior art shirred sticks.

An advantage of the tapered mandrel used in conjunction with the shirring wheels of this invention is that slippage of the primary folds which enables high packing efficiency to be achieved can be closely controlled and the axial symmetry around the circumference of the stick or slug is maintained and this results in straight slugs. The tapered mandrel also enables minor changes in the material thickness etc. to be catered for without altering the machine.

We claim:

1. Apparatus for shirring a tubular casing including at least one pair of toothed shirring wheels, each of said wheels having a plurality of teeth, each tooth in said wheel being formed with a groove in a radial plane of substantially semicircular cross section in the outer face of the wheel, each tooth having a crest surface which is part of said groove and is uniform at all points around the shirring wheel, and in which the wheel has flexible outer walls which extend upwardly from the face of the teeth around the circumference of the wheel and in which the teeth on said shirring wheel contact the casing to be shirred when the leading edge of adjacent teeth contacting the casing are at an angle past the bottom dead center position defined by the equation $$A = \cos^{-1}(R-r)/R$$

in which R is the minimum radius of the tooth from the axis of the wheel and r is the radius of the casing to be shirred.

2. The apparatus of claim 1 in which the radius of the groove in said teeth is 15 to 30% less than the radius of the casing to be shirred.

3. The apparatus of claim 2 in which the radius of the groove in said teeth is 20 to 30% less than the radius of the casing to be shirred.

4. The apparatus of claim 1 in which the trailing edge of each tooth is defined by a series of points approximately parallel to the leading edge such that on any circular section perpendicular to the axis the ratio of the circumferential length between successive points where the leading and trailing edges cut that section and the circumferential length between either point and the next such point is constant.

5. The apparatus of claim 1 in which there are cut-out portions in the outer walls of the tooth wheels to provide uniform flexibility throughout the circumference of the wheel.

6. Apparatus according to claim 1 and in which the teeth of each wheel are spaced apart round the wheel at a circumferential distance apart so that the Mark/space ratio lies in the range 3:4 to 4:3.

7. Apparatus according to claim 6 and in which the mark/space ratio is 1:1.

* * * * *